(12) United States Patent
Wang

(10) Patent No.: US 7,576,889 B2
(45) Date of Patent: Aug. 18, 2009

(54) CASCADE OF MATRIX-LUT FOR COLOR TRANSFORMATION

(75) Inventor: Shen-Ge Wang, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 987 days.

(21) Appl. No.: 10/972,357

(22) Filed: Oct. 26, 2004

(65) Prior Publication Data

US 2006/0087665 A1    Apr. 27, 2006

(51) Int. Cl.
| G06K 1/00 | (2006.01) |
| G03F 3/08 | (2006.01) |
| H04N 1/40 | (2006.01) |
| G06K 9/00 | (2006.01) |

(52) U.S. Cl. .................. 358/1.9; 358/445; 358/518; 358/523; 382/162; 382/167; 345/604

(58) Field of Classification Search .................. 358/1.9, 358/518; 382/162, 167; 345/604
See application file for complete search history.

(56) References Cited

U.S. PATENT DOCUMENTS

| 5,297,219 | A | * | 3/1994 | Weldy | .......... 382/299 |
| 5,412,491 | A |   | 5/1995 | Bachar |  |
| 6,340,975 | B2 | * | 1/2002 | Marsden et al. | .......... 345/590 |
| 6,360,007 | B1 |   | 3/2002 | Robinson et al. |  |
| 6,643,029 | B2 |   | 11/2003 | Kumada et al. |  |
| 7,180,629 | B1 | * | 2/2007 | Nishio et al. | .......... 358/1.9 |

* cited by examiner

*Primary Examiner*—King Y Poon
*Assistant Examiner*—Thomas J Lett
(74) *Attorney, Agent, or Firm*—Oliff & Berridge, PLC

(57) ABSTRACT

Various implementations of this invention provide a method of color transformation of image data that included: providing at least two units, each unit comprising a combination of a plurality of look-up tables and a M×N matrix; providing image data configured in a first color space; processing the image data using a first unit to generate an output; and processing the generated output using a second unit to generate a second output; wherein the plurality of look-up tables are used to transform an input color space to a device dependent color space, and the M×N matrix is used to perform one of at least converting color data defined in standard space to data defined in XYZ space and converting image data defined in XYZ space to image data defined in LAB space.

15 Claims, 3 Drawing Sheets

CASCADE OF MATRIX-LUT FOR COLOR TRANSFORMATION

BACKGROUND OF THE INVENTION

1. Field of Invention

This application relates to color transformation, and more specifically to the use of matrices and look-up tables for color transformation.

2. Description of Related Art

The following patents are specifically incorporated by reference: U.S. Pat. No. 6,643,029 to Kumada et al. for its teaching of an image processing method using look-up tables (LUTs); U.S. Pat. No. 6,360,007 to Robinson et al. for its teaching of an optimized color LUT transformation based upon image requirements; and U.S. Pat. No. 5,412,491 to Bachar for its teaching of a color transformation apparatus using LUTs.

The generation of color documents often includes two steps, an image input step and an image output step. In the image input step, image signals such as red, green and blue signals in an RGB color space, representative of an image, are produced by a scanner or other image input device. The color signals generated by image input devices are usually device-dependent, in other words, the same RGB values might represent different colors for different input devices. In the image output step, the image is printed by a color printer or other image output device. Most color output devices either use cyan, magenta and yellow signals in a CMY color space or in a CMYK with an additional color signal for black. The color signals used for image output devices are also usually device-dependent. Instead of transferring color signals in the RGB space from a scanner directly to color signals in the CMYK space to a color printer, a device-independent color space is commonly used as the intermediate color space for other evolved image processing, such as compression, decompression, enhancement, correction, and the like. The device independent color spaces are also often standard color spaces, such as the XYZ space, with X, Y and Z color signals, the CIE Lab space with L*, a* and b* signals, and the YCbCr space with Y, Cb and Cr signals. The device-independent color spaces unambiguously define color information that is not limited by the dynamic range or color gamut of any physically realizable device. The most common color transformations are those for converting colors between a device-dependent color space and a device-independent color space. For the image input step, the transformation might be from an RGB color space to the CIE Lab color space. For the output step, the transformation might be from the CIE Lab color space to a CMYK color space.

In order to overcome the device-dependency of image input and image output devices, each device is typically provided with a unique color transformation unit for converting image signals both to and from a device-independent color space.

Using a combination of several one-dimensional look-up tables and a M×N matrix is a common method for color transformation. Many devices, such as, for example, Xerox DigiPath™ scanners, are built with special circuits using 3 LUTs and a 3×3 matrix for color conversion with a high speed data rate. In addition, more than one color conversion may be needed. Thus, some devices are equipped with more than one 3 LUT+3×3 Matrix unit. For example, DigiPath scanners have both RGB to CIE Lab and RGB to YCbCr conversion circuits built into their systems.

SUMMARY OF THE INVENTION

A problem with such configurations is that the combination of 3 LUTs plus a 3×3 matrix does not provide the highest accuracy required by some applications for high quality color reproduction. Various exemplary implementations of this invention propose to use a cascade of two or more 3 LUT+3×3 Matrix units to obtain a higher accuracy of color conversion.

Various exemplary systems and methods provide for color transformation of image data that includes: providing at least two units, each including a combination of a plurality of look-up tables and a M×N matrix; and cascading the at least two units with each other. As an exemplary implementation only, most the following description is directed to cascades with two units composed of 3 LUTs and a 3×3 matrix. However, units constituted of a number of LUTs other than 3 and a matrix other than a 3×3 matrix can also be implemented in cascades as described here. By cascading two such units, the input color signals, such as RGB signals from a scanner, are transformed into an intermediate signal space by the first 3 LUT+3×3Matrix unit, then the intermediate signals are further transformed by the second 3 LUT+3×3M unit of the cascade into the output color space, such as, for example, CIE Lab signals.

Various implementations provide an image processing apparatus that includes: an image file containing information regarding an image to be processed; a first plurality of look-up tables that receive the information contained in the image file; a first M×N matrix coupled to the first plurality of look-up tables, the coupled first plurality of look-up tables and first M×N matrix processing the information contained in the image file and outputting image data. Various implementations further provide: a second plurality of look-up tables that receive image data from the coupled first plurality of look-up tables and first M×N matrix; and a second M×N matrix coupled to the second plurality of look-up tables, the coupled second plurality of look-up tables and second M×N matrix processing the output data from the coupled first plurality of look-up tables and first M×N matrix. According to various implementations, the spatial order of coupling of the M×N matrix and the plurality of LUTs is the same for both the first M×N matrix coupled to the first plurality of LUTs and the second M×N matrix coupled to the second plurality of LUTs.

Further, various implementations provide an image processing apparatus that includes: an image file containing information regarding an image to be processed; a first M×N matrix that receives the information contained in the image file and a first plurality of look-up tables coupled to the first M×N matrix, the coupled first M×N matrix and first plurality of look-up tables processing the information contained in the image file and outputting image data. Various implementations further provide: a second M×N matrix that receives image data from the coupled first M×N matrix and first plurality of look-up tables; and a second plurality of look-up tables coupled to the second M×N matrix, the coupled second M×N matrix and second plurality of look-up tables processing the output data from the coupled first M×N matrix and first plurality of look-up tables. According to various implementations, the spatial order of coupling of the M×N matrix and the plurality of LUTs is the same for both the first M×N matrix coupled to the first plurality of LUTs and the second M×N matrix coupled to the second plurality of LUTs.

BRIEF DESCRIPTION OF THE DRAWINGS

Various exemplary implementations of this invention are described in detail, with reference to the following figures, wherein.

DETAILED DESCRIPTION

These and other features and advantages are described in, or are apparent from, the following detailed description.

Figure 1:
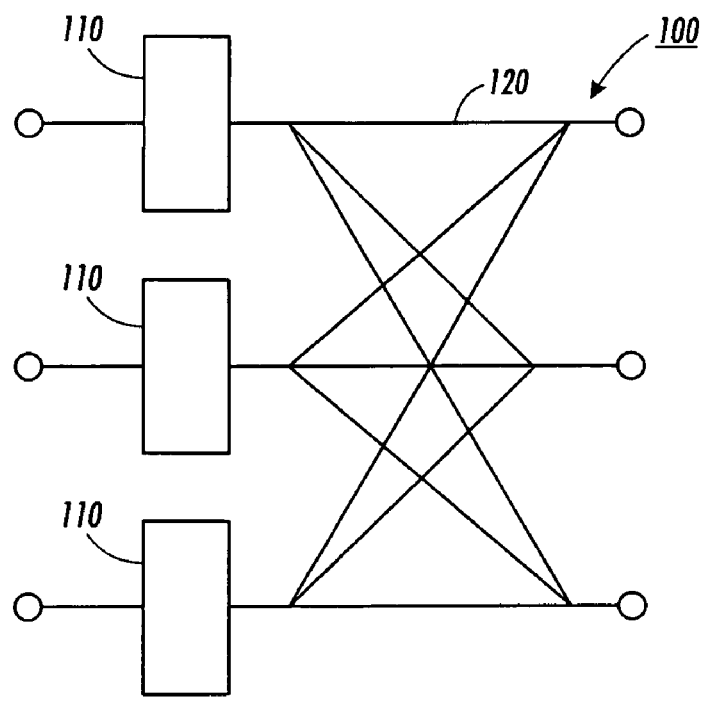
FIG. 1 is a schematic illustration of an exemplary combination of three one-dimensional look-up tables and a 3×3 matrix.

FIG. 1 is a schematic illustration of an exemplary combination of three one-dimensional look-up tables and one 3×3 matrix. In FIG. 1, one-dimensional LUTs 110 are combined with a 3×3 matrix 120 to offer accuracy in color transformations. In FIG. 1, three LUTs 110 are combined with one 3×3 matrix 120 such that the output of the three LUTs 110 constitutes an input to the 3×3 matrix 120.

Figure 2:
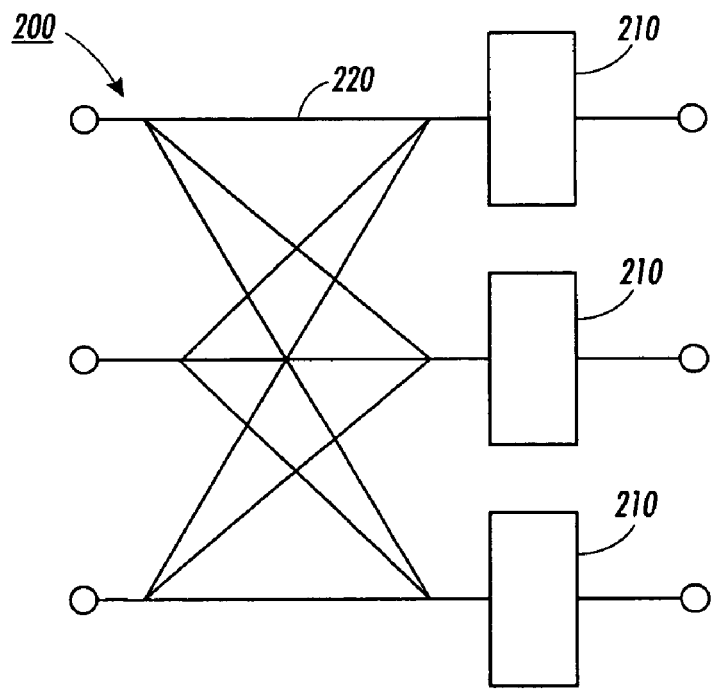
FIG. 2 is a schematic illustration of another exemplary combination of three one-dimensional look-up tables and a 3×3 matrix.

FIG. 2 illustrates an alternative configuration, which includes a combination of a 3×3 matrix 220 combined with three LUTs 210 wherein the output of the 3×3 matrix 220 constitutes an input to the three LUTs 210.

Although such configurations may be widely used, they do not provide the same accuracies obtained by other, more complicated color conversion methods such as, for example, methods involving three-dimensional LUTs or neural networks. However, such configurations may be suitable for use in many digital color imaging applications, especially where high data flow rates are involved. For example, high resolution color scanners may be equipped with specially designed circuits based on combinations of three LUTs and a 3×3 matrix in order to convert scanned images in RGB color space to other color spaces such as, for example, LAB space and YCbCr space. Further, devices may be equipped with more than one unit that consists of a combination of three LUTs and a 3×3 matrix for different color conversions. Since device characterization and calibration is involved in all color input and output devices, most color conversion units allow quick updating of some or all parameters and/or as coefficients of LUTs and 3×3 matrices.

Figure 3:
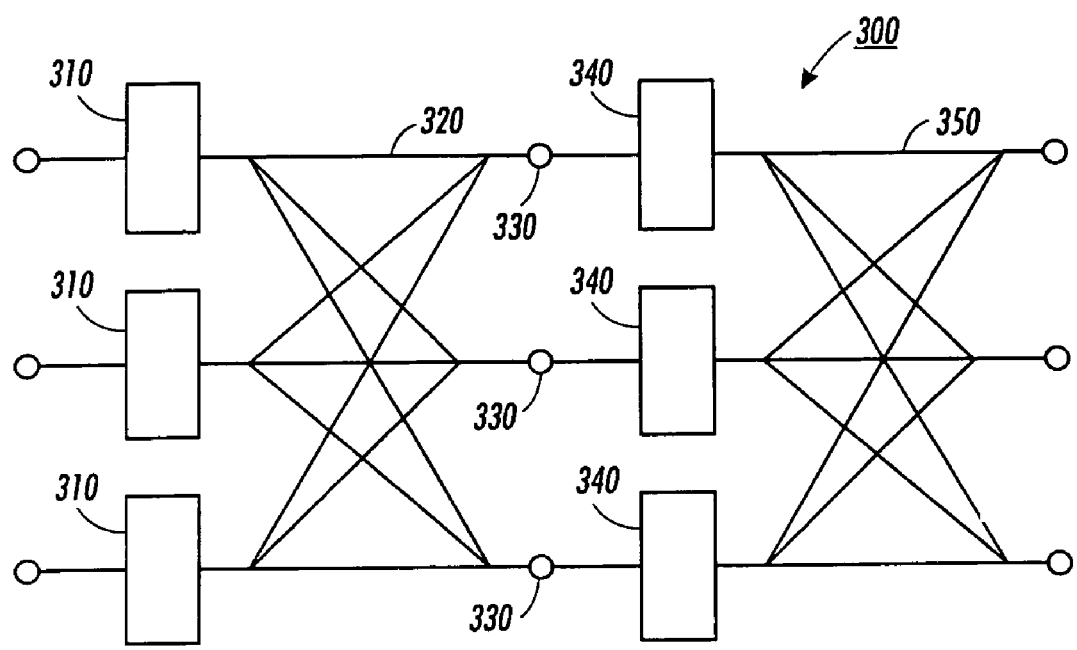
FIG. 3 is a schematic illustration of an exemplary cascade of two units composed of three look-up tables and a 3×3 matrix.

FIG. 3 is a schematic illustration of an exemplary cascade of two units composed of 3 look-up tables and a 3×3 matrix. In FIG. 3, a cascade of two units, each comprising a combination of three LUTs and a 3×3 matrix is illustrated. According to various implementations, the two units are coupled to each other via coupling points 330. According to various implementations, the first unit comprises three LUTs 310 and a 3×3 matrix 320, and the second unit comprises three LUTs 340 and a 3×3 matrix 350. Since the cascade configuration resembles a simple artificial neural network with three inputs, three outputs and one intermediate layer with three elements, calibration of the cascade for a particular color conversion can be treated as a 3-3-3 neural network. An optimization method may be based on a conjugate gradient, and simulated annealing is adapted to the calibration of the cascade.

For example, in order to convert an image from RGB color space to LAB color space, a scaled sigmoid function can be used for the three LUTs 340 of the second unit, and a scaled cubic root function can be used for the three LUTs 310 of the first unit. In addition to 18 coefficients of the two 3×3 matrices 330 and 350, six bias terms of the six LUTs 310 and 340 can also be treated as independent variables for optimization.

Various tests have been performed in order to compare the accuracy obtained with the cascade configuration described above to the conventional 3 LUTs+3×3 Matrix method. A comparison table illustrated in Table 1 illustrates the result of testing a conversion from RGB color space to LAB color space for four different media, including photographic, lithographic, xerographic, and ink jet, and for a combination of these four media. For each method and medium, the conversion has been optimized using data from a calibration target scanned by a scanner. In Table 1, each method/medium combination is characterized by two numbers: the first number is an average variation of the accuracy ΔE; and the second number is a maximum variation of the accuracy. Accordingly, the first number represents an average variation between a measured LAB value and a calculated LAB value, and the second number represents a maximum variation between the measured LAB value and the calculated LAB value. A good accuracy is obtained when both the average variation and the maximum variation between the measured LAB value and the calculated LAB value are small.

TABLE 1

| | Average and maximum variations | | | | |
| --- | --- | --- | --- | --- | --- |
| | Photo-graphic | Litho-graphic | Xero-graphic | Inkjet | Combin-ation |
| LUTs + 3 × 3 | 3.3/15.7 | 3.0/12.6 | 4.4/21.7 | 3.3/12.0 | 3.9/21.7 |
| Cascade | 3.0/11.5 | 2.0/7.6 | 2.9/15.5 | 2.0/9.2 | 2.5/15.5 |

As shown by the testing result in Table 1, cascading two units each comprising three LUTs and a matrix via coupling ports clearly achieves higher accuracy than the conventional 3 LUTs+3×3 Matrix method.

Although FIG. 3 illustrates the combination of only two units of three LUTs and a matrix, a similar combination of more than two units of three LUTs and 3×3 matrices may be used in order to further increase the accuracy of color transformations. Also, the two matrices 320 and 350 can have sizes other than 3×3 where, for example, the first matrix 320 can be a 3×6 matrix followed by six one-dimensional look-up tables 340 and a 6×3 matrix 350.

Figure 4:
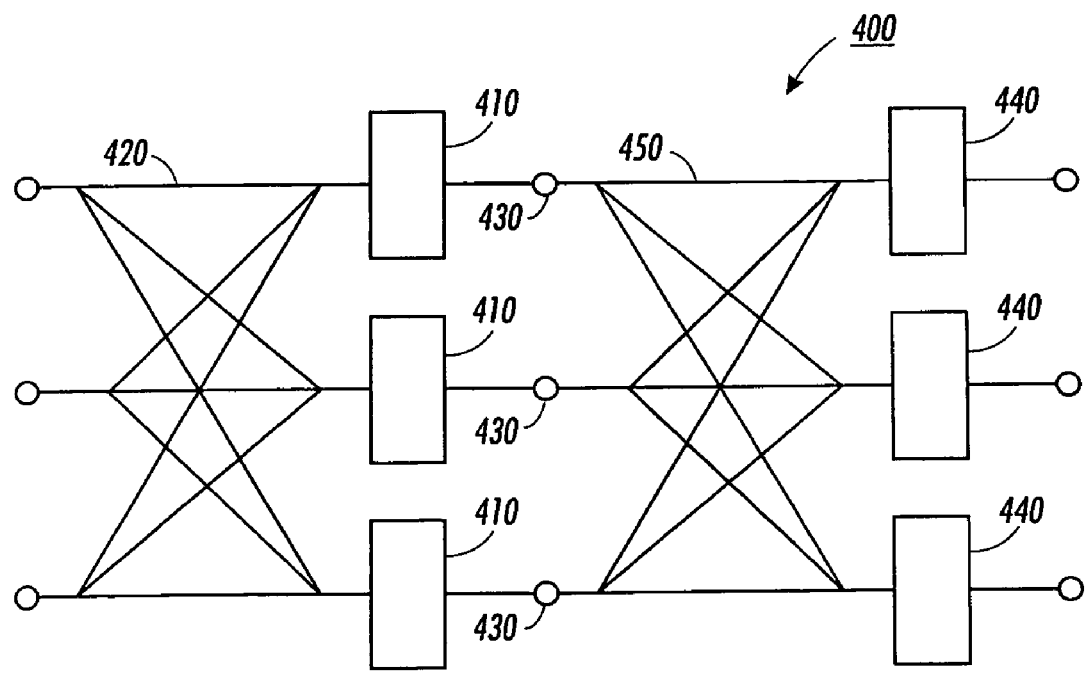
FIG. 4 is a schematic illustration of another exemplary cascade of two units composed of three look-up tables and a 3×3 matrix.

FIG. 4 is a schematic illustration of another exemplary combination 400 of look-up tables and 3×3 matrices. In FIG. 4, a cascade of two units, each comprising a combination of a 3×3 matrix and three LUTs is illustrated. The two units may be coupled to each other via coupling points 430. Accordingly, the color accuracy gained by employing the cascade of two units is significant because the image data, processed by the first unit comprising a 3×3 matrix 420 and three LUTs 410, is further processed by the second unit comprising a 3×3 matrix 450 and three LUTs 440. Since the cascade configuration also resembles a simple artificial neural network with three inputs, three outputs and one intermediate layer with three elements, calibration of the cascade for a particular color conversion can also be treated as a 3-3-3 neural network. An optimization method may be based on a conjugate gradient, and simulated annealing is adapted to the calibration of the cascade. According to various implementations, the configuration illustrated in FIG. 4 differs from the configuration illustrated in FIG. 3 only by the manner in which the matrix and the LUTs are ordered.

Figure 5:
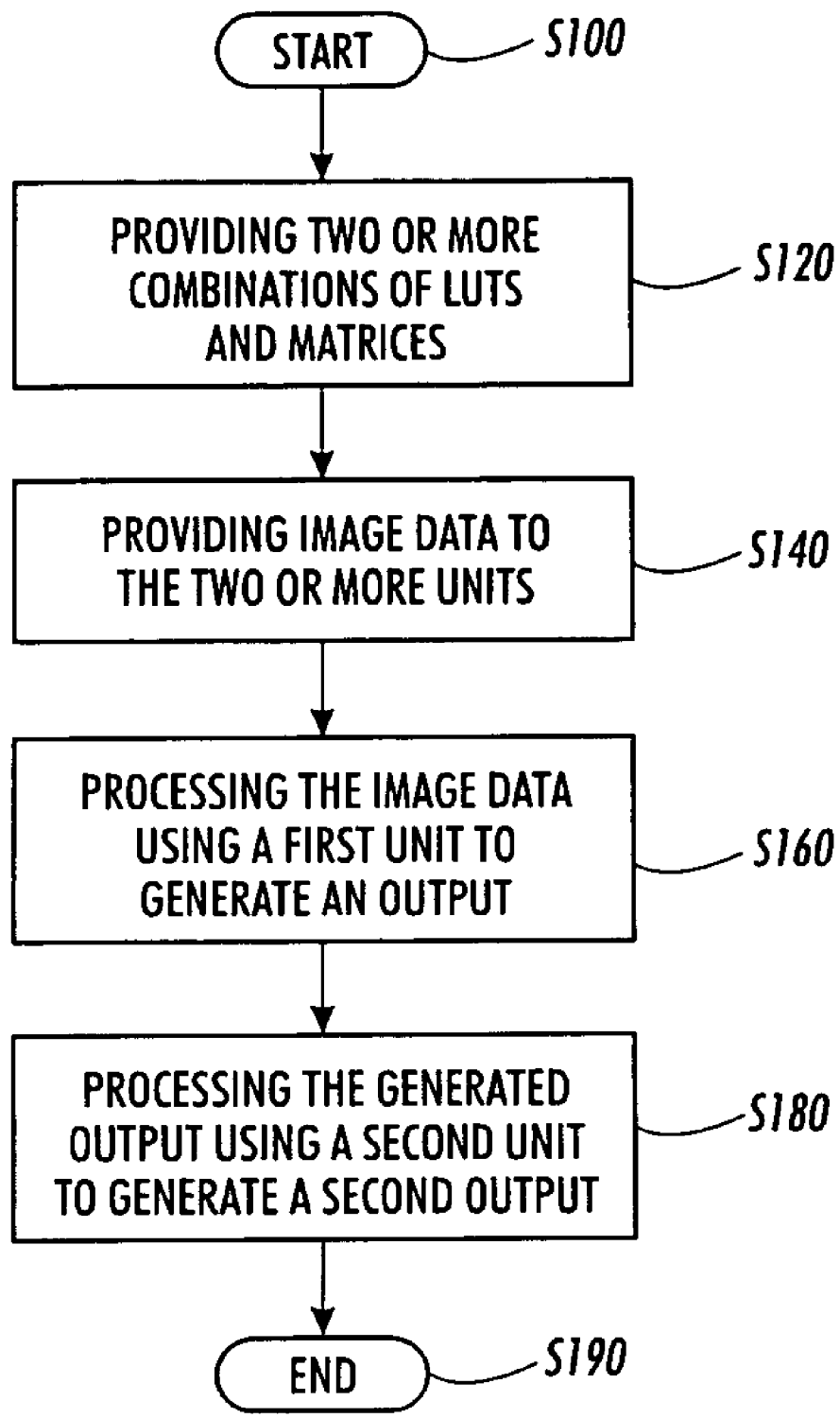
FIG. 5 is a flowchart illustrating an exemplary method of color transformation.

FIG. 5 is a flowchart illustrating an exemplary method of color transformation. The method starts in step S100, and continues to step S120, where at least two units, each being a combination of a plurality of look-up tables and a M×N matrix, are provided. The units may consist of a combination of three one-dimensional LUTs and one 3×3 matrix. Next, control continues to step S140. During step S140, image data is provided to the at least two units. Next, control continues to step S160. During step S160, the image data may be processed using a first unit and an output is generated by the first unit. When the image data is processed using the first unit during step S160, then control continues to step S180. During step S180, the output generated during step S160 by the first unit may be processed by a second unit. Accordingly, the original image data may be processed once using the first unit, and then processed a second time using the second unit. Such a sequential image processing method may increase the accuracy of the color transformation of the original image data. Next, control continues to step S190, where the method ends. Two units of a combination of three LUTs and one 3×3 matrix may be used using this method, wherein the three outputs of the first unit are used as the inputs of the second unit. The M×N matrices may be used to perform the color conversion of color data defined in, for example, standard space, to color data defined in, for example, XYZ space. Moreover, the M×N matrices may also be used to convert color data defined in XYZ space to image data defined in, for example, LAB space.

While details of the invention have been described in conjunction with exemplary implementations, such implementations are intended to be illustrative and not limiting. Various modifications, substitutes, or the like are possible.

What is claimed is:

1. A method of color transformation of image data on a computer, the method comprising:
   receiving, by the computer, image data configured in a first color space;
   processing the image data by a first unit of at least two units of the computer to generate a first output, each unit of the at least two units comprising a combination of a plurality of look-up tables and a M×N matrix; and
   processing the generated first output by a second unit of the at least two units of the computer to generate a second output comprising output image data in a second color space,
   wherein one of the first and second color spaces is a device dependent color space and the other of the first and second color spaces is a device independent color space,
   at least one of the step of processing the image data by the first unit and the step of processing the image data by the second unit includes processing the image data by the corresponding plurality of look-up tables by a scaled sigmoid function, and
   the output image data in the second color space is a more accurate translation of the image data from the first color space into the second color space than is achievable by translating the image data from the first color space into the second color space using only three one-dimensional look-up tables and one 3×3 matrix.

2. The method of claim 1, wherein the device independent color space is one of: XYZ color space, Lab color space, and YCbCr color space.

3. The method of claim 1, wherein each unit comprises three one-dimensional look-up tables and a 3×3 matrix.

4. The method of claim 1, further comprising:
   optimizing and calibrating coefficients for the at least two units by applying neural network optimizing and calibrating methods to the at least two units.

5. The method of claim 1, wherein the device dependent color space is a print engine color space.

6. The method of claim 1, wherein a third unit is used to process the generated second output to generate a third output, and a fourth unit is used to process the generated third output to generate a fourth output.

7. An image processing apparatus, comprising:
   a first plurality of look-up tables;
   a first M×N matrix coupled to the first plurality of look-up tables, the coupled first plurality of look-up tables and first M×N matrix processing information defined in a first color space and contained in an image file, the coupled first plurality of look-up tables and first M×N matrix outputting intermediate image data;
   a second plurality of look-up tables; and
   a second M×N matrix coupled to the second plurality of look-up tables, the coupled second plurality of look-up tables and second M×N matrix processing the intermediate image data output from the coupled first plurality of look-up tables and first M×N matrix and outputting output image data defined in a second color space,
   wherein one of the first and second color spaces is a device dependent color space and the other of the first and second color spaces is a device independent color space,
   the first plurality of look-up tables process the information by a scaled cubic root function,
   the second plurality of look-up tables process the information by a scaled sigmoid function, and
   the output image data is a more accurate translation of the information from the first color space into the second color space than is achievable by translating the information from the first color space into the second color space using only three one-dimensional look-up tables and one 3×3 matrix.

8. The apparatus of claim 7, further comprising at least one additional M×N matrix and corresponding additional plurality of look-up tables coupled to the first and second M×N matrices and first and second plurality of look-up tables, the first, second, and at least one additional M×N matrices, and the first, second, and at least one additional plurality of look-up tables collectively processing the information, in cascade, to transform the information from the first color space to the second color space.

9. The apparatus of claim 7, wherein the first and second pluralities of look-up tables each comprise three look-up tables.

10. The apparatus of claim 7, wherein at least one of the first and second M×N matrices is a 3×3 matrix.

11. The apparatus of claim 7, wherein the device independent color space is one of: XYZ color space, YCrCb color space, and Lab color space.

12. The method of claim 1, wherein the step of processing the image data by the first unit includes processing the image data by the plurality of look-up tables of the first unit by a scaled cubic root function.

13. The method of claim 1, wherein the step of processing the image data by the second unit includes processing the image data by the plurality of look-up tables of the second unit by a scaled sigmoid function.

14. The method of claim 4, wherein the step of optimizing and calibrating the color conversion device includes calibrating the at least two units by simulated annealing.

15. The method of claim 4, wherein the step of optimizing and calibrating the color conversion device includes optimizing the at least two units by a conjugate gradient method.

* * * * *